United States Patent

Shimura

[11] Patent Number: 5,886,797
[45] Date of Patent: Mar. 23, 1999

[54] METHOD AND APPARATUS FOR CONTROLLING A SPATIAL FILTERING PROCESS BASED ON CHARACTERISTICS OF IMAGE DATA

[75] Inventor: Hiroshi Shimura, Kanagawa, Japan

[73] Assignee: Ricoh Co. Ltd., Tokyo, Japan

[21] Appl. No.: 371,167

[22] Filed: Jan. 11, 1995

[30] Foreign Application Priority Data

Jan. 14, 1994 [JP] Japan ................................. 6-002805
Aug. 31, 1994 [JP] Japan ................................. 6-206289

[51] Int. Cl.[6] ................................................. H04N 1/40
[52] U.S. Cl. ........................ 358/455; 358/458; 358/448; 382/266
[58] Field of Search .................................. 358/455, 456, 358/458, 462, 463, 464, 443, 447, 448, 530, 532, 534; 382/266, 263, 264

[56] References Cited

U.S. PATENT DOCUMENTS 5,381,490 1/1995 Shin ........................................ 358/462
5,539,541 7/1996 Ushida .................................... 358/462

FOREIGN PATENT DOCUMENTS 3-88478 4/1991 Japan .
6-152959 5/1994 Japan .

OTHER PUBLICATIONS

"Segmentation Method for Documents Containing Text/Picture (Screened Halftone, Continuous Tone)" Satoshi Ohuchi et al, The Proceeding of the IIEEJ 20th Annual Meeting and Advanced Session Jun. 6–Jun. 11, 1992 pp. 39–47.

Primary Examiner—Thomas D. Lee
Attorney, Agent, or Firm—Oblon, Spivak, McClelland, Maier & Neustadt, P.C.

[57] ABSTRACT

A method and apparatus for controlling a MTF correction process using the reference pixel density and the edge amount of the reference pixel. An edge amount is a result of a high-pass filtering process of the reference pixel data. A pixel density conversion table and an edge amount conversion table adaptively determine the MTF correction value based on the reference pixel density and the edge amount of the reference pixel. The high-pass filtering process is implemented with bit-shift operations and an add operation of the pixel data. To use the reference pixel density data for controlling the MTF correction process, high adaptability for low contrast character region.

38 Claims, 9 Drawing Sheets

| 91 | 79 | 53 |
|----|----|----|
| 89 | 72 | 45 |
| 86 | 69 | 37 |

*FIG. 3A*

| 6 | 6 | 5 |
|---|---|---|
| 6 | 6 | 6 |
| 6 | 6 | 6 |

*FIG. 3B*

| PIXEL DENSITY | SHIFT AMOUNT |
|---------------|--------------|
| 1-3           | 0            |
| 4-15          | 4            |
| 16-31         | 3            |
| 31-255        | 10           |

*FIG. 6*

| | | |
|---|---|---|
| −16 | 0 | −16 |
| 0 | 64 | 0 |
| −16 | 0 | −16 |

*FIG. 4A*

| | | |
|---|---|---|
| 0 | −8 | 0 |
| −8 | 32 | −8 |
| 0 | −8 | 0 |

*FIG. 4B*

| | | |
|---|---|---|
| −4 | 0 | −4 |
| 0 | 16 | 0 |
| −4 | 0 | −4 |

*FIG. 4C*

| EDGE AMOUNT | SHIFT AMOUNT |
|---|---|
| ~ −256 | 4 |
| −255 ~ −192 | 5 |
| −191 ~ −128 | 6 |
| −127 ~ −127 | 7 |
| 128 ~ 191 | 5 |
| 192 ~ 255 | 4 |
| 256 ~ 387 | 3 |
| 388 ~ 512 | 2 |
| 512 ~ | 1 |

*FIG. 5*

| 0 | 0 | 0 |
|---|---|---|
| $\frac{1}{4}$ | $\frac{1}{2}$ | $\frac{1}{4}$ |
| 0 | 0 | 0 |

*FIG. 8*

| −1 | −1 | −1 |
|---|---|---|
| −1 | 8 | −1 |
| −1 | −1 | −1 |

*FIG. 14*

| TEXT TABLE 58 | ABSOLUTE VALUE OF EDGE AMOUNT | SHIFT AMOUNT |
|---|---|---|
| | 256 ~ | 2 |
| | 128 ~ 255 | 3 |
| | 64 ~ 127 | 4 |
| | 0 ~ 63 | 10 |

*FIG. 9*

| PHOTOGRAPH TABLE 57 | ABSOLUTE VALUE OF EDGE AMOUNT | SHIFT AMOUNT |
|---|---|---|
| | 256 ~ | 3 |
| | 128 ~ 255 | 4 |
| | 64 ~ 127 | 5 |
| | 0 ~ 63 | 10 |

*FIG. 10*

| TEXT TABLE 60 | DENSITY | SHIFT AMOUNT |
|---|---|---|
| | ALL DENSITIES | 10 |

FIG. 11

| PHOTOGRAPH TABLE 61 | DENSITY | SHIFT AMOUNT |
|---|---|---|
| | 8 ~31 | 4 |
| | 0 ~7<br>31~ | 10 |

FIG. 12

| 0 | -4 | 0 |
|---|---|---|
| -4 | 17 | -4 |
| 0 | -4 | 0 |

*FIG. 13A*

| 0 | -2 | 0 |
|---|---|---|
| -2 | 9 | -2 |
| 0 | -2 | 0 |

*FIG. 13B*

| 0 | -1 | 0 |
|---|---|---|
| -1 | 5 | -1 |
| 0 | -1 | 0 |

*FIG. 13C*

| 0 | 0 | 0 |
|---|---|---|
| 0 | 1 | 0 |
| 0 | 0 | 0 |

*FIG. 13D*

METHOD AND APPARATUS FOR CONTROLLING A SPATIAL FILTERING PROCESS BASED ON CHARACTERISTICS OF IMAGE DATA

BACKGROUND OF THE INVENTION

1. Field of the Invention

This invention relates to the field of a digital image duplicator, such as a digital copying machine, facsimile, etc., and in particular to a method and an apparatus for improving the quality of an output image of the digital image duplicator.

2. Discussion of the Related Art

In a field of a digital image duplication system, such as a digital copying machine or a facsimile machine, one important goal is to improve a quality of a duplicate image of an original document. For this improvement, an appropriate image data processing based on the characteristics of the input image, i.e., whether the input image is a binary text image, a full-color photographic image, or a gray scale image, must be provided. Stated another way, different data processings based on differences in the image region in the original image is required so as to accomplish a high quality image duplication.

In a case that the input image is photographic image data, it is important to prevent the generation of moire noise, which appears as a result of interference between a spatial periodic element of a gradation in the original image and a dither matrix pattern for reproducing the gradations of the photographic image with the digital duplicator. To prevent the appearance of moire noise, a smoothing process utilizing a low pass filter on the original image to control the spatial periodic elements of the original may be provided.

On the other hand, if the input image is binary image data, typically represented by a text region in the original document, the input image will have high frequency elements of spatial periodicity in the image data at edge portions of characters in the text region. These high-frequency elements are decreased with the smoothing process and, as a result, the duplicated image becomes blurred. To prevent this problem which occurs when the input image is text data, it is important to enhance the edge portion to improve a contrast in the duplicated image. To achieve this, a MTF (Modulation Transfer Function) correction process is provided to enhance the edge portions of the image data. However, the MTF correction process sometimes generates a side effect with respect to low density pixels in a photographic region or gray scale region. The side effect is that some roughness in the low contrast gradation area may be generated. As a result, the conventional MTF correction does not provide satisfactory results if the input image is a photograph or has a display of a gray scale.

To provide an adequate image data processing, there is some related arts in this technical field. Japanese Patent Laid-Open Patent Application 3-88478(1991) discloses an apparatus with an adaptive image data processing in a digital image duplicator, which controls a smoothing filter and an edge detection filter which utilize a smoothing conversion table and an edge conversion table. This apparatus controls a processing parameter based on the classification result of an image region of input image data, such as for a photographic document or for a text document. However, the above-mentioned apparatus is not sufficient to utilize a reference pixel density data itself for controlling the MTF correction process for the adaptive image data processing.

Another apparatus is presented by Japanese Patent Laid-Open Patent Application 6-152959(1994) by the applicant of the present invention. This publication discloses an apparatus directed to an adaptive image data processing using an edge amount, with an arithmetic processing of the reference image data for controlling a smoothing process and a MTF correction process. However, this apparatus requires two kinds of circuits for detecting the edge amount of the reference pixel and for processing a MTF correction using the edge amount. These two circuits require a plurality of multipliers. As a result, this apparatus requires a relatively large scale of hardware implementation, which is costly. Furthermore, this apparatus does not utilize a reference pixel density data for controlling the adaptive image data processing.

SUMMARY OF THE INVENTION

Accordingly, one object of the present invention is to provide a novel method and apparatus to process an input image with an accurate MTF correction process using a density of a reference pixel.

Another object of the present invention is to achieve such a result in a device with a reduced hardware scale, but which still achieves a high quality duplicated image.

A further object of this invention is to provide a sufficient MTF correction process using an image region classification process for a low contrast text region of an original image.

This invention controls an MTF correction process based on a reference pixel density data and an edge amount of a reference pixel, which is a result of a high-pass filtering process of the reference pixel data. To use the reference pixel density data for controlling the MTF correction process, the present invention enables high adaptability for a low contrast character region. The high-pass filtering process is implemented with only bit-shift operations and an adding operation of the pixel data. Such an implementation allows a sufficient reduction in hardware required, and this allows a reduction in cost. An edge amount conversion table and a pixel density conversion table adaptively determine the MTF correction value for the reference pixel based on the reference pixel density and the edge amount of the reference pixel.

Furthermore, in combination with an image classification process, the present invention enables high adaptability for appropriate data processing for classification of an image, such as a text image and a photographic image.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3A and 3B show examples of reference density data;

FIGS. 4A, 4B, and 4C illustrate examples of filtering coefficients of a high pass filter of the first embodiment of the present invention;

FIG. 5 describes one example of contents of an edge amount conversion table implemented in the first embodiment of the present invention;

FIG. 6 describes one example of a reference pixel density conversion table implemented in the first embodiment of the present invention;

FIG. 8 shows an example of filtering coefficients of low-pass filter of the second embodiment of the present invention;

FIG. 9 shows an example of a conversion table for a text image which converts an edge amount to an enhancement amount implemented in the second embodiment of the present invention;

FIG. 10 shows an example of a conversion table for a photographic image which converts an edge amount to an enhancement amount implemented in the second embodiment of the present invention;

FIG. 11 shows an example of a conversion table for a character image which converts a reference pixel density to an enhancement amount implemented in the second embodiment of the present invention;

FIG. 12 shows an example of a conversion table for a photograph image which converts a reference pixel density to an enhancement amount implemented in the second embodiment of the present invention;

FIG. 13 is an example of filtering coefficients for MTF correction with respect to the enhancement value in the second embodiment of the present invention;

FIG. 14 describes one example of weighting coefficients for a reference pixel in the second embodiment of the present invention.

DETAILED DESCRIPTION OF THE PREFERRED EMBODIMENT

The present invention has been implemented within the scope of a digital image data processing system, such as a digital copying machine or a facsimile machine. In the following description, specific details are set forth in order to provide a thorough understanding of the present invention. It will be apparent, however, to one skilled in the art that the present invention may be practiced without such specific details. In other instances, well known components that operate with a digital image duplication system, for example, an image scanning component or an image developing component, have not been shown in detail in order to not unnecessarily obscure the present invention.

Figure 1:
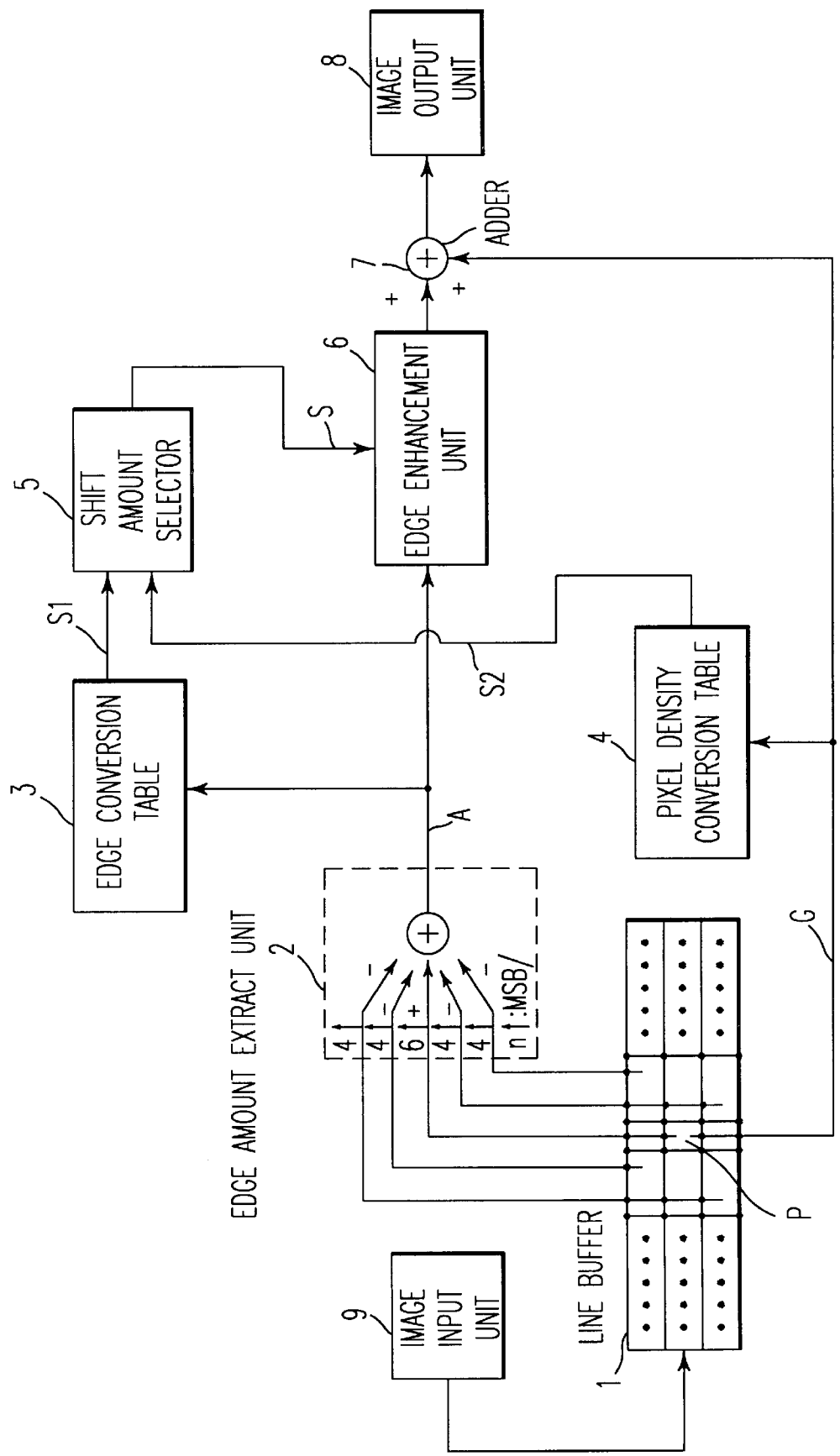
FIG. 1 is a block diagram of a first embodiment of the present invention.

Referring now to the drawings, wherein like reference numerals designate identical or corresponding parts throughout the several views, and more particularly to FIG. 1 thereof, an image data processing apparatus of an implemented embodiment of the present invention is shown which typically comprises the following components: image input unit 9, line buffer 1, edge amount extract unit 2, edge amount conversion table 3, pixel density conversion table 4, shift amount selector 5, edge enhancement unit 6, adder 7, and image output unit 8.

Line buffer 1 stores input image data with respect to a reference pixel (P), which is in a center of a predetermined region defined by the capacity of the line buffer 1. The input data input into the line buffer 1 is preferably density data such as YMC or YMCK data, which drives a printer unit corresponding to an amount of ink or toner. This density data is derived from image input unit 9 which includes conventional processing, such as a logarithmic translation or color correction for RGB data obtained by image scanning from an image scanner.

Edge amount extract unit 2 provides a spatial filtering process for the predetermined region to define an edge amount of the reference pixel, which represents the density change of the reference pixel within the predetermined region. That is, the edge amount is determined by subjecting the density data input into line buffer 1 to a high-pass filtering process for a reference pixel density data and neighboring pixel density data. As specific examples, FIGS. 3A and 3B are examples of matrices of the density data stored in line buffer 1. In both of FIGS. 3A and 3B the reference pixel is in the center of the matrices so that in FIG. 3A the reference pixel has a density of 72 and in FIG. 3B the reference pixel has a density of 6. This density data represents a density of the reference pixel in one color, e.g. in the yellow color in the YMC system.

To obtain the edge amount of each of these reference pixels, which are the center pixels shown in FIG. 3A and 3B, the reference pixel density data is subjected to a high pass filtering by multiplying the matrices of FIGS. 3A and 3B by one of the matrices shown for example in FIGS. 4A, 4B and 4C. With reference to FIGS. 3A, when the reference pixel density data, i.e., the center pixel in FIG. 3A having a reference pixel density of 72, is subjected to the high pass filtering of FIG. 4A, the edge result is a numerical value 336 (binary 0101010000). With reference to FIG. 3B, when the reference pixel density data, i.e., the center pixel in FIG. 3B having a reference pixel density of 6, is subjected to the high-pass filtering shown in FIG. 4A, the edge amount value is a numerical value 16 (binary 0000010000). Other examples of appropriate high-pass filtering operation coefficients which can be utilized in the present invention are also shown in FIGS. 4B and 4C.

It is also noted that in the present invention the edge amount extract unit 2 can be formed of just a plurality of shift registers and an adder. In FIG. 1, the edge amount extracting unit 2 is represented by an adder and five shift registers. These five shift registers are formed of four 4 bit shift registers and one 6 bit shift register, each of the shift registers being a most significant bit shift register. In this way, in the present invention each of the 4 bit shift registers shifts the density data of the appropriate neighboring pixel 4 bits to the most significant bit (MSB), represented by the −16 in FIG. 4A (the number −16 being negative by also taking a 2's complement of the neighboring pixel density data). The 6 bit shift register shifts the density data of the reference pixel 6 bits to the most significant bit, represented by the 64 in FIG. 4A. It is also noted in the case of 8 bit density data and coefficients such as is shown in FIGS. 4A–4C, it is necessary to use 14 bit representations for the edge amount data because of the maximum value of the edge amount would become 255×64.

Edge amount conversion table 3 stores enhancement values corresponding to edge amounts and provides enhancement values for the corresponding extracted edge amount of the reference pixel. Pixel density conversion table 4 stores enhancement values corresponding to a reference pixel density, and provides an enhancement value for a corresponding reference pixel density. Shift amount selector 5 determines an enhancement value based on a comparison of the enhancement value from the edge amount conversion table 3 with the enhancement value from the reference pixel density conversion table 4. Edge enhancement unit 6 enhances the reference pixel data for MTF correction, using the determined enhancement value.

Figure 2:
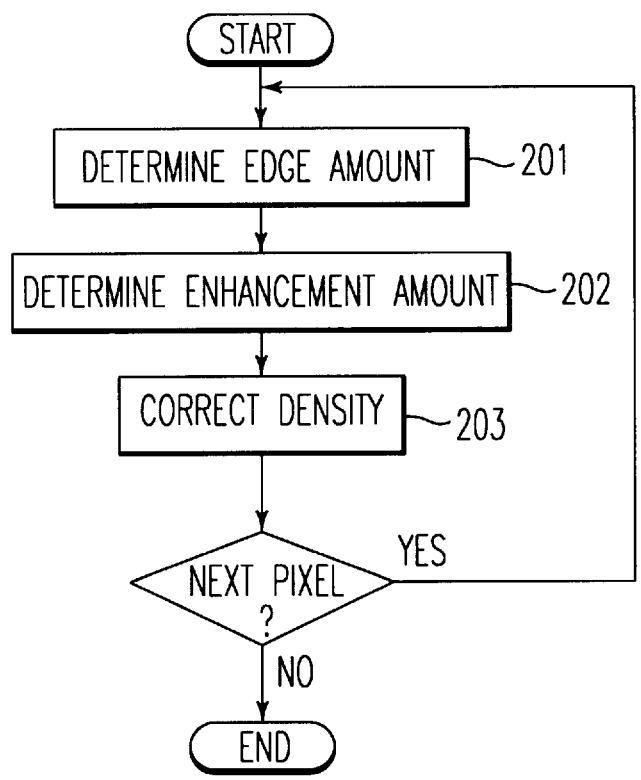
FIG. 2 is a flow chart of a process of a first embodiment of the present invention.

FIG. 2 is a flow chart of the MTF correction process of this invention. In the step 201, this invention determines an edge amount of the reference pixel based on the density change of the reference pixel in a predetermined region. This step 201 operates by subtracting a density value of neighboring pixels from the density value of the reference pixel, such as discussed above. In the step 202, this invention determines an appropriate enhancement amount for MTF correction of the reference pixel, which is derived from the edge amount conversion table 3 and the pixel density conversion table 4. In step 203, this invention determines a MTF correction result from the edge amount of the reference pixel and the appropriate enhancement amount and corrects the density of the reference pixel. In step 204, this invention makes a repetition from step 201 through step 203 for all input pixel data.

More specifically describing the operation of the present invention, FIG. 1 describes a first specific embodiment of this invention. Initially, an input image data is acquired as raster image data by a scanning operation of an image input unit 9 which includes a device such as an image scanner with a CCD (charge couple device). The input image may include not only a binary image region, such as a text portion, but also a photograph or a gray-scale region. An original document image provided from the image input unit may be represented by 400-dpi (dot per inch) resolution, 8-bit (256-tone) reflectance-linear data. The input image data may be an image data representation in a gray scale data or color data with RGB (Red, Green, Blue) signals per pixels.

The input data is data which varies linearly with light intensities received as a result of being reflected by an original image, typically RGB data. This RGB data can then be converted into YMC or YMCK density data in the image input unit 9. The YMC or YMCK data is then stored in line buffer 1. In this embodiment of the present invention, it is defined that a value 255 of the image data is a maximum value, which corresponds to a maximum density in the original image with respect to a MSB (Most Significant Bit). Therefore, the value 0 of the image data is a minimum value, which corresponds to a minimum density in the original image with respect to a LSB (Least Significant Bit). These density image data from the input image unit 9 are stored in the line buffer 1. When processing a color image, the process of this invention will provide three or four color signals, one for each of the YMC or YMCK signals. FIGS. 3A and 3B only show one example of the input signal, e.g. the yellow density data. In the examples shown in FIGS. 3A and 3B, the reference pixel of FIG. 3A is more toward an edge of an image and has higher density than the reference pixel of FIG. 3B.

The line buffer 1 preferably comprises a FIFO (First-In First-Out) memory, and stores each pixel data and shifts each pixel data based on the main scanning direction of the input image. For this operation, a reference pixel data (G) is provided for the following process. The line buffer 1 stores the image data for at least three scan lines for the high-pass filtering process of the reference pixel data in the edge amount extract unit 2, as discussed above.

The edge amount extract unit 2 takes an enhancement of high frequency elements of the image data based on the extracted reference pixel data (G) and neighboring pixel data in a predetermined region defined by a capacity of the line buffer 1, as discussed above. In this embodiment, the predetermined region is defined by a 3*3 matrix of pixels based on the capacity of the line buffer 1, and the reference pixel is in the center of the matrix. The processing result of the edge amount extract unit 2 corresponds to an edge amount (A) of the reference pixel in this invention.

Generally, a result of a spatial filtering process of a reference pixel data is provided to a total sum value of multiplication with each pixel data in the predetermined region and the filtering coefficients corresponding to the predetermined region. As another possibility, this process may be a convolution for the reference pixel defined by filtering coefficients. In such conventional processings it is required to use at least one multiplier, and therefore it is hard to reduce the filtering processing circuit in terms of its scale in hardware implementation. The present invention overcomes such drawbacks.

Referring again to FIGS. 4A, 4B, 4C, there are shown examples of high-pass filtering coefficients of the present invention. In each example, the value of each element is a power of 2, and the total sum value of the elements become 0, meaning that the low frequency components of the image data are cut-off. Therefore, and as discussed above, in this invention the edge amount extract unit 2 can be implemented with only a plurality of bit-shifters and an adder, which thereby reduces the scale of the processing circuit in its hardware implementation.

In the example of the filter coefficients of FIG. 4A, the element of the filter coefficient corresponding to the reference pixel is 64. As a result, the bit-shifter for the reference pixel data in the edge amount extract unit 2 takes in a 6-bit shift operation to the MSB side, see FIG. 1. For the neighboring pixel data, which corresponds to the other elements of the filter coefficients with respect to the neighboring pixels, the value of the filter coefficient elements is 16, and the edge amount extract unit 2 takes a 4-bit shift operation to the MSB side for each neighboring pixel data, and the edge amount extract unit 2 takes 2's complement for the bit-shifted neighboring pixel data, so as to invert a sign of the neighboring pixel data. The edge amount extract unit 2 then sums the reference pixel data and the neighboring pixel data by an adder therein. In this process, the edge amount of the reference pixel (A) is acquired. This filtering process thus does not use any multipliers and can be implemented in various ways by logic circuits in a hardware implementation, and these variations of implementations which do not use a multiplier are included in the scope of this disclosure.

The edge amount reference data (A) is then input to edge conversion table 3. Edge conversion table 3 converts the edge amount (A) to a first predetermined amount of bit-shift (S1). FIG. 5 shows an example of the contents of the edge conversion table 3. FIG. 5 indicates that the larger the absolute value of the edge amount of the reference pixel, the smaller the corresponding amount of bit-shift.

Therefore, in the following description, a pixel in a text portion which requires a high resolution in the duplicated image, i.e. a pixel with a high edge amount, undergoes only a small amount of bit shift, and thus this pixel receives an enhanced MTF correction. According to this process, the resolution of this pixel is improved in the duplicated image. On the other hand, a pixel in a photographical portion or gray scale portion which requires high gradation in the duplicated image, i.e. which has a low edge amount, undergoes a large amount of bit shift, and thus has relatively less MTF correction. According to the decreased MTF correction in the photographical or gray scale image portion, a roughness in the gradation portion in the duplicated image is prevented from being generated, which would sometimes be generated as a side effect of the MTF correction.

Another feature of the edge conversion table 3 is that the contents of the table have non-linear characteristics with respect to the sign of the edge amount. In a general MTF correction process, a white area adjacent to a contour line of characters may unnecessarily be generated, which results from the reference pixel density changing from high to low and the edge amount of the reference pixel being negative. In the present invention, even if the absolute value of the edge amounts are the same, the shift amount is different based on the sign of the edge amount. For example, and with reference to FIG. 5, if a pixel has an edge amount value of +255, the positive edge amount +255 is converted by a shift amount 4, although the negative edge amount −255 is converted by a shift amount 5. Therefore the negative edge amount −255 provides less of a MTF correction to further prevent the generation of unnecessary white areas adjacent to a contour line of characters.

With specific reference to the examples shown in FIGS. 3A and 3B, processing the reference pixel data and neighboring pixel data shown in FIG. 3A, resulted in an edge amount of 336. With reference to FIG. 5, such an edge amount corresponds to a bit shift of 3, i.e., a bit shift to the most significant bit direction of 3. With reference to the reference pixel data and neighboring pixel data shown in FIG. 3B, the edge amount is 16. With reference to FIG. 5, such an edge amount corresponds to a bit shift amount of 7.

A pixel density conversion table 4 converts the reference pixel density value (G) by a second predetermined amount of bit-shift (S2). FIG. 6 shows an example of the contents of the pixel density conversion table 4. The table 4 has contents such that when the reference pixel density value is relatively low, i.e., has a low contrast character image, the corresponding amount of bit-shift is smaller. Accordingly, in the following description, a pixel in a relatively low density region takes on a small amount of bit-shift and thus undergoes enhanced MTF correction. In this process, the resolution of this pixel is improved in the duplicated image. In FIG. 6, the shift amount 10 of the density conversion table 4, which corresponds to an upper level 31 of the reference pixel density value, means no change in the pixel data, because the representation of the pixel data is 8-bit in this embodiment and thus the enhancement signal added in adder 7 will have a value of zero. The specific values for the density conversion table 4 and specifically the different density ranges and corresponding bit-shifts will of course vary based on the characteristics of the image processing.

With reference to the specific examples shown in FIGS. 3A and 3B, the specific operation of the pixel density conversion table 4 will be explained. In FIG. 3A the reference pixel has a density value of 72. As shown in FIG. 6, this pixel density of 72 corresponds to a bit shift amount of 10. In the example shown in FIG. 3B, the reference pixel data has a density value of 6, which corresponds to a bit shift amount of 3.

A shift amount selector 5 then selects the smaller bit shift value from the shift amount based on the edge amount of the reference pixel (S1) and from the density of the reference pixel (S2). The shift amount selector 5 outputs the selected shift amount (S) to an edge enhancement unit 6. This selection thus operates for selecting strong enhancement of the MTF correction to the reference pixel in the following MTF correction process.

With reference to the specific examples shown in FIGS. 3A and 3B, the operation of the shift amount selector 5 will be further explained. In the example of FIG. 3A, the reference pixel density data value 72 corresponds to a bit-shift of 10, and the reference pixel density data 72 corresponds to an edge amount value 336, which corresponds to a bit shift amount of 3. The shift amount selector 5 then selects the smaller of such shift amounts, and thus a shift amount of 3 is selected. With reference to the example shown in FIG. 3B, the reference pixel density data value 6 corresponds to a shift amount of 3, and the reference pixel density data 6 corresponds to an edge amount value 16, which corresponds to a bit shift amount of 7. The shift amount selector 5 then selects a smaller shift amount and thus selects the shift amount of 3.

The edge enhancement unit 6 then provides a bit shift operation for the edge amount of the reference pixel (A) based on the selected shift amount (S) to the LSB side. In a case that the selected shift amount (S) is equal to 2, the edge amount of the reference pixel (A) is multiplied by 4. With specific reference to the examples shown in FIGS. 3A and 3B, the operation of the edge enhancement unit 6 will now be explained. With reference to the data shown in FIG. 3A, the output of the edge enhancement unit is the reference pixel data numerical value 336 (binary 0101010000) and a shift amount of 3 is selected, resulting in numerical value 42 (binary 0000101010) after the operation of edge enhancement unit 6. With reference to the example shown in FIG. 3B, the output of the edge enhancement unit is numerical value 16 (binary 0000010000), and a shift amount of 3 is determined, resulting in numerical value 2 (binary 000000010).

An Adder 7 adds the reference pixel data (G) and the bit-shifted edge amount from the edge enhancement unit 6. As a result of this operation, the present invention acquires a MTF correction process with respect to the reference pixel data, and outputs the results to further image output unit 8, which includes any further conventional image processors and a printer or display, etc. The image output unit 8 will typically include an electrophotographic printer using toner or an ink jet printer using ink.

In this embodiment, the present invention processes the MTF correction value of the reference pixel using the density of the reference pixel and the extracted edge amount of the referenced pixel. The present invention calculates the edge amount and the MTF correction value based on a common circuit with bit-shifters and an adder. In this way, this invention does not require the use of any multipliers for the edge detection process and the MTF correction process. Furthermore, by using two kinds of conversion tables, it is easy to provide an appropriate MTF correction process for the reference pixel. Further, when the reference pixel has a larger edge amount, strong edge enhancement is provided, and when the reference pixel has a relatively lower density, adequate edge enhancement is provided from the conversion tables. As a result, the device of the present invention provides necessary MTF correction for the reference pixel characteristic, and accomplishes high quality image duplication.

Figure 7:
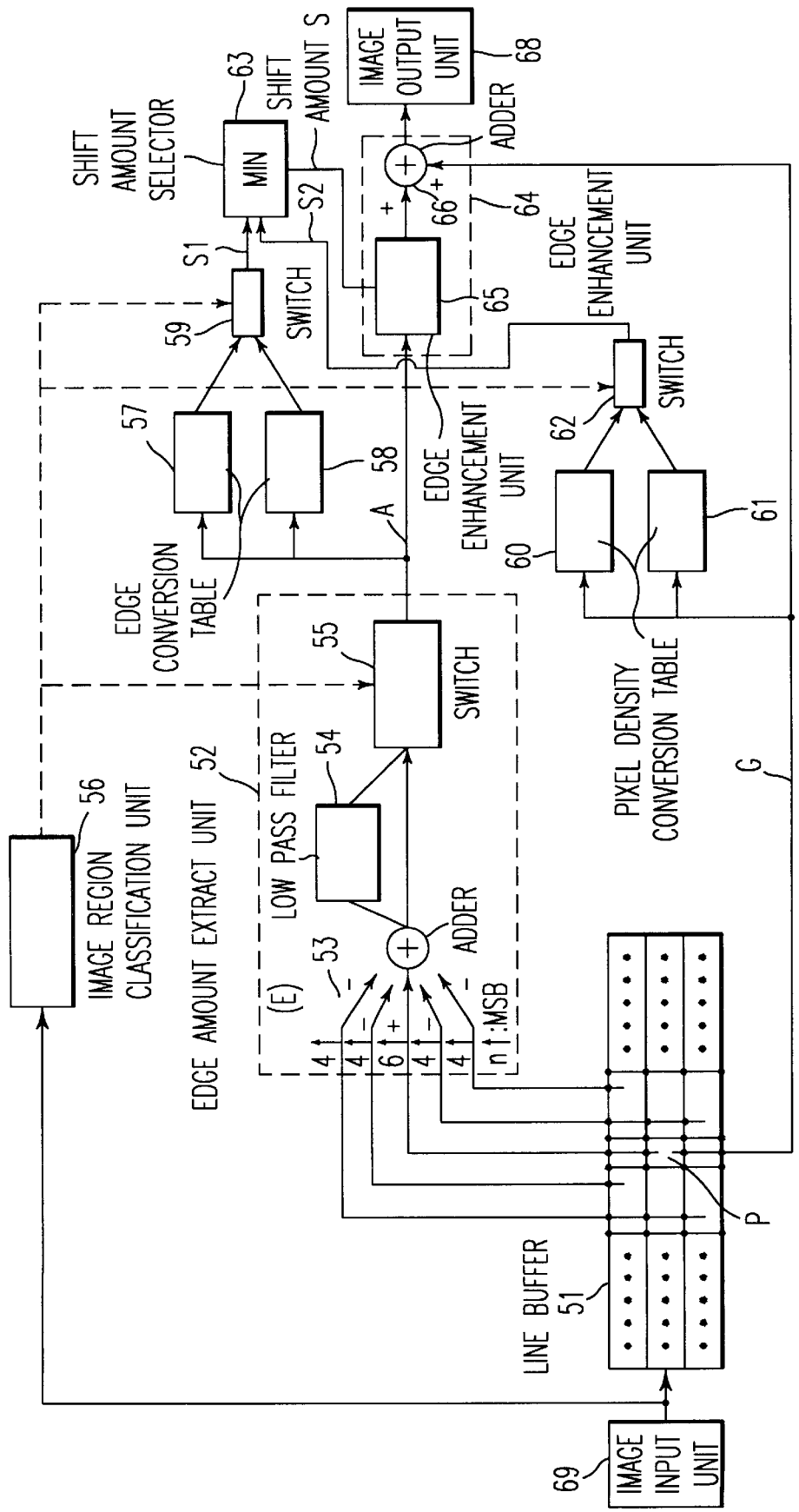
FIG. 7 is a block diagram of a second embodiment of the present invention.

A second implemented embodiment of this invention is shown in FIG. 7. This embodiment further utilizes an image region classification unit 56. In the second embodiment of the present invention, the same numbered components illustrated in FIG. 1 contained in FIG. 7 are the same and will not be specifically described again to avoid unnecessary obscurity of the present invention.

In this embodiment of FIG. 7, the image region classification unit 56 classifies the input image data as a photographic region or a text region so as to provide appropriate image data processing of the input image data.

The image region classification process of the present invention is well-known art in the field of the present invention. For example, this process to classify an image region is disclosed in the paper of "Image Region Classification Method for Character/Picture (Halftone, Photograph) Mixed Image", proposed by the present applicant, Electronics Information Communication Society Paper Journal Vol.J75-DI1 No.1, page 39–47, January 1992, which is hereby incorporated by reference. However, alternative methods of classifying the image region would not depart from the spirit and scope of the present invention.

As shown in FIG. 7, an edge amount extract unit 52 includes a low-pass filter 54 connected with adder 53 for controlling the generation of moire noise in processing a photographic region after a high-pass filtering process such as discussed with respect to FIG. 1. A switch 55 exchanges the output signals of the filtering processing unit 52 based on the classification of the image region classification unit 56. An example of filtering coefficients for the low-pass filter 54 for controlling a spatial periodicity of gradation in a photographic image are shown in FIG. 8. Switch 55 will be switched to allow the output of the low-pass filter 54 to be the output of the edge extract unit when the input image is classified as a photograph or gray-scale image.

Furthermore, this embodiment include two kinds of edge conversion tables 57, 58 and pixel density conversion tables 60, 61. A switch 59 exchanges the edge conversion tables 57 and 58, and a switch 62 exchanges the pixel density conversion tables 60 and 61, based on the classification of the image region classification unit 56.

For text image processing, switches 59 and 62 select the edge conversion table 58 and the pixel density conversion table 60, and for photographic or gray-scale image processing, switches 59 and 62 select the conversion tables 57 and 61.

Referring to FIG. 9 and FIG. 10, examples of the edge conversion tables 58 and 57 are constructed to provide stronger enhancement for the reference pixel in accordance with the absolute value of an edge amount of the reference pixel. Furthermore, in this embodiment, a stronger enhancement is provided when the input image is classified as a text region rather than a photographic or gray-scale region. This results in clarifying the contrast in text edge and controlling the generation of moire or unnatural noise in gradation of a photograph area in duplicated images.

Referring to FIG. 11, the pixel density conversion table 60 for text data is constructed to shift amount 10 for any pixel density. This means that no enhancement would be provided for the text region. This is because when the input pixel is classified as a text region, the input pixel has adequate density for image duplication.

Generally, in an image classification process, a low contrast text region is classified as a photographic region, and not classified as a text region. According to this classification, in many cases, the low contrast text region has been provided only a smoothing process or a strong smoothing process and has not been provided sufficient MTF correction process. For this reason, the character edge pixel may become blurred in a duplicated image because of the lack of density. To overcome this drawback, in this invention the pixel density conversion table 61 is constructed to provide predetermined enhancement to a relatively low density pixel.

Referring to FIG. 12, there is shown an example of the pixel density conversion table 61. As shown in FIG. 12, a pixel which exists in the density level 8 to 31 provides enhancement for MTF correction of the reference pixel and a pixel which exists at a density level lower than a level 8 or greater than a level 31 does not provide enhancement for MTF correction. This is a regulation for not enhancing background noise which exists in a lower density area image.

In a variation of this invention, the conversion table can store enhancement values instead of providing shift amounts. In this implementation, a plurality of filtering coefficients, illustrated in FIGS. 13A and 13D in which the filtering coefficients of FIG. 13A are the strongest and the filtering coefficients progressively weaken to the weakest in FIG. 13D, are selected for MTF correction with respect to the reference pixel based on the enhancement value. Furthermore, instead of the high-pass filtering process of this invention, a weighting operation for a reference pixel in a predetermined region would be used in edge amount extraction. For example, the weighting coefficients for the reference pixel illustrated in FIG. 14 could be used in the edge amount extract unit 2 of this invention.

In the above mentioned embodiments of this invention, the representation of image data is applied to the description of YMC or YMCK image density data. But the same procedure applies to other signal representations also, such as RGB, YIQ, XYZ, Lab. The conversion tables discussed above will then be appropriately tuned for these other signal representations.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by letters patent of the United States is:

1. An apparatus for controlling a spatial filtering process for input image data comprising:

an input for inputting density data of the input image data, including density data of a reference pixel and neighboring pixels which neighbor said reference pixel;

an edge amount detector detecting an edge amount of the reference pixel, the edge amount representing a change in density between the reference pixel and the neighboring pixels;

an edge correction processor determining a first correction value for the reference pixel based on the detected edge amount;

a density correction processor determining a second correction value for the reference pixel based on the reference pixel density data;

a correction processor for selecting either of the first correction value or the second correction value based on comparing the first correction value with the second correction value, and for correcting said reference pixel density data based on the selected of the first correction value or the second correction value.

2. The apparatus according to claim 1, wherein the edge correction processor comprises a first converting table for storing first shift amounts on which the first correction value is based in correspondence with the detected edge amount.

3. The apparatus according to claim 2, wherein the first converting table has a non-linear characteristic for the correspondence of detected edge amounts to first correction values.

4. The apparatus according to claim 2, wherein the density correction processor comprises a second converting table for storing second shift amounts on which the second correction value is based in correspondence with the input reference pixel density data.

5. The apparatus according to claim 2, wherein the density correction processor comprises a second converting table for storing the second correction value in correspondence with the input reference pixel density data.

6. The apparatus according to claim 1, wherein the edge amount detector comprises a plurality of bit-shifters and an adder for adding outputs from the plurality of bit-shifters.

7. The apparatus according to claim 1, further comprising an image region classification unit for classifying a region which contains the reference pixel, and the edge amount detector and the edge correction processor determining the respective first and second correction values based on the classification of the region from the image region classification unit.

8. The apparatus according to claim 7, wherein the edge correction processor comprises a first conversion table and a second conversion table, the first correction value being determined from the first conversion table when the image region is classified as a first image region, the first correction value being determined from the second conversion table when the image region is classified as a second image region.

9. The apparatus according to claim 8, wherein the density correction processor comprises a third conversion table and a fourth conversion table, the second correction value being determined from the third conversion table when the image region is classified as a first image region, the second correction value being determined from the fourth conversion table when the image region is classified as a second image region.

10. The apparatus according to claim 8, wherein the density correction processor comprises a third conversion table and a fourth conversion table, the second correction value being determined from the third conversion table when the image region is classified as the first image region, the second correction value being determined from the fourth conversion table when the image region is classified as the second image region.

11. The apparatus according to claim 7, wherein the edge amount detector comprises a plurality of bit-shifters and an adder for adding outputs from the plurality of bit-shifters.

12. The apparatus according to claim 1, wherein said edge amount detector performs a high-pass filtering operation.

13. The apparatus according to claim 1, wherein the input comprises an image scanner.

14. The apparatus according to claim 1, further comprising an image output unit to record an output image.

15. The apparatus according to claim 4, wherein the second converting table has the second shift amounts corresponding to the second correction values only within a predetermined range of input reference pixel density data.

16. An apparatus for controlling a spatial filtering process for input image data comprising:
an input means for inputting density data of the input image data, including density data of a reference pixel and neighboring pixels which neighbor said reference pixel;
an edge amount detector means for detecting an edge amount of the reference pixel, the edge amount representing a change in density between the reference pixel and the neighboring pixels;
an edge correction means for determining a first correction value for the reference pixel based on the detected edge amount;
a density correction means for determining a second correction value for the reference pixel based on the reference pixel density data;
a correction means for selecting either of the first correction value or the second correction value based on comparing the first correction value with the second correction value, and for correcting said reference pixel density data based on the selected of the first correction value or the second correction value.

17. The apparatus according to claim 16, wherein the edge correction means comprises a first converting table means for storing first shift amount on which the first correction value is based in correspondence with the detected edge amount.

18. The apparatus according to claim 17, wherein the first converting table means has a non-linear characteristic for the correspondence of detected edge amounts to first correction values.

19. The apparatus according to claim 17, wherein the density correction means comprises a second converting table means for storing second shift amounts on which the second correction value is based in correspondence with the input reference pixel density data.

20. The apparatus according to claim 17, wherein the density correction means comprises a second converting table means for storing the second correction value in correspondence with the input reference pixel density data.

21. The apparatus according to claim 16, wherein the edge amount detection means comprises a plurality of bit-shifting means and an adding means for adding outputs from the plurality of bit-shifting means.

22. The apparatus according to claim 16, further comprising an image region classification means for classifying a region which contains the reference pixel, and the edge amount detection means and the edge correction means determine the respective fist and second correction values based on the classification of the region from the image region classification means.

23. The apparatus according to claim 16, wherein the edge correction means comprises a first conversion table means and a second conversion table means, the first correction value being determined from the first conversion table means when the image region is classified as a first image region, the first correction value being determined from the second conversion table means when the image region is classified as a second image region.

24. The apparatus according to claim 23, wherein the density correction means comprises a third conversion table means and a fourth conversion table means, the second correction value being determined from the third conversion table means when the image region is classified as a first image region, the second correction value being determined from the fourth conversion table means when the image region is classified as a second image region.

25. The apparatus according to claim 23, wherein the density correction means comprises a third conversion table means and a fourth conversion table means, the second correction value being determined from the third conversion table means when the image region is classified as the first image region, the second correction value being determined from the fourth conversion table means when the image region is classified as the second image region.

26. The apparatus according to claim 22, wherein the edge amount detector means comprises a plurality of bit-shifting means and an adding means for adding outputs from the plurality of bit-shifting means.

27. The apparatus according to claim 16, wherein said edge amount detector means performs a high-pass filtering operation.

28. The apparatus according to claim 16, wherein the input means comprises an image scanning means.

29. The apparatus according to claim 16, further comprising an image output means for recording an output image.

30. The apparatus according to claim 19, wherein the second converting table means has the second shift amounts corresponding to the second correction values only within a predetermined range of input reference pixel density data.

31. A process for controlling a spatial filtering for input image data comprising the steps of:

inputting density data of the input image data, including density data of a reference pixel and neighboring pixels which neighbor said reference pixel;

detecting an edge amount of the reference pixel, the edge amount representing a change in density between the reference pixel and the neighboring pixels;

determining a first correction value for the reference pixel based on the detected edge amount;

determining a second correction value for the reference pixel based on the reference pixel density data;

selecting either of the first correction value or the second correction value based on comparing the first correction value with the second correction value; and correcting said reference pixel density data based on the selected of the first correction value or the second correction value.

32. The process according to claim 31, wherein the step of determining the first correction value comprises looking up in a first converting table first shift amounts on which the first correction value is based in correspondence with the detected edge amount.

33. The process according to claim 32, wherein the first converting table has a non-linear characteristic for the correspondence of detected edge amounts to the first shift amounts on which the to first correction value is based.

34. The process according to claim 32, wherein the step of determining the second correction value comprises looking up in a second converting table second shift amounts on which the second correction value is based in correspondence with the input reference pixel density data.

35. The process according to claim 31, further comprising the step of classifying a region which contains the reference pixel, and the step of detecting an edge amount and the step of determining the respective first and second correction values is based on the classification of the region.

36. The process according to claim 35, wherein the step of determining the first correction value comprises determining the first correction value from a first conversion table when the image region is classified as a first image region, and determining the first correction value from a second conversion table when the image region is classified as a second image region.

37. The process according to claim 36, wherein the step of determining a second correction value comprises determining the second correction value from a third conversion table when the image region is classified as a first image region, and determining the second correction value from a fourth conversion table when the image region is classified as a second image region.

38. The process according to claim 36, wherein the step of determining a second correction value comprises determining the second correction value from a third conversion table when the image region is classified as the first image region determining the second correction value from a fourth conversion table when the image region is classified as the second image region.

\* \* \* \* \*